(12) United States Patent
Miyamoto

(10) Patent No.: US 11,728,549 B2
(45) Date of Patent: Aug. 15, 2023

(54) BATTERY DESIGN IN MULTIPLE DIMENSIONS

(71) Applicant: Toyota Motor Engineering & Manufacturing North America, Inc., Plano, TX (US)

(72) Inventor: Kaito Miyamoto, East Amherst, NY (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 374 days.

(21) Appl. No.: 16/747,218

(22) Filed: Jan. 20, 2020

(65) Prior Publication Data

US 2021/0159476 A1    May 27, 2021

Related U.S. Application Data

(63) Continuation-in-part of application No. 16/698,286, filed on Nov. 27, 2019, now Pat. No. 11,568,102.

(51) Int. Cl.
*H01M 50/00* (2021.01)
*H01M 50/46* (2021.01)
(Continued)

(52) U.S. Cl.
CPC ............ *H01M 50/46* (2021.01); *H01M 4/64* (2013.01); *H01M 10/0436* (2013.01); *H01M 10/058* (2013.01); *H01M 10/0525* (2013.01)

(58) Field of Classification Search
CPC ............ H01M 50/154; H01M 50/264; H01M 10/0436; H01M 10/058
See application file for complete search history.

(56) References Cited

U.S. PATENT DOCUMENTS

| 9,559,349 B2 | 1/2017 | Braun et al. |
| 10,038,214 B2 | 7/2018 | Rust, III et al. |

(Continued)

FOREIGN PATENT DOCUMENTS

| WO | 2009024355 A1 | 2/2009 |
| WO | 2010007579 A1 | 1/2010 |

(Continued)

OTHER PUBLICATIONS

Ning et al., "Holographic Patterning of High-Performance on-Chip 3D Lithium-Ion Microbatteries," Proceedings of the National Academy of Sciences of the United States of America, 112 (21), (2015) (in 6 pages).

(Continued)

*Primary Examiner* — Cynthia H Kelly
*Assistant Examiner* — Monique M Wills
(74) *Attorney, Agent, or Firm* — Christopher G. Darrow; Darrow Mustafa PC

(57) ABSTRACT

Embodiments described herein relate to a battery. In one embodiment, a battery includes a first collector plate and a second collector plate arranged in parallel and spaced apart by an internal distance. The battery includes a first electrode and a second electrode disposed between the first collector and the second collector. The first electrode and the second electrode have a geometry that improves power and capacity of the battery. The battery further includes a separator disposed between the first electrode and the second electrode.

20 Claims, 6 Drawing Sheets

(51) Int. Cl.
　　　H01M 4/64　　　(2006.01)
　　　H01M 10/0525　(2010.01)
　　　H01M 10/04　　(2006.01)
　　　H01M 10/058　　(2010.01)

(56) References Cited

U.S. PATENT DOCUMENTS

| | | | | |
|---|---|---|---|---|
| 2003/0099884 | A1* | 5/2003 | Chiang | H01G 11/06 |
| | | | | 429/233 |
| 2012/0052375 | A1* | 3/2012 | Johnson | H01M 4/525 |
| | | | | 429/206 |
| 2016/0126558 | A1 | 5/2016 | Lewis et al. | |
| 2018/0241035 | A1 | 8/2018 | Hur et al. | |
| 2021/0249697 | A1* | 8/2021 | Yoshioka | H01M 10/052 |

FOREIGN PATENT DOCUMENTS

| | | |
|---|---|---|
| WO | 2016151336 A1 | 9/2016 |
| WO | 20190160810 A1 | 8/2019 |

OTHER PUBLICATIONS

Hahn et al., "Development of Micro Batteries Based on Micro Fluidic MEMS Packaging," Symposium of Design, Test, Integration & Packaging of MEMS and MOEMS (2017) (in 5 pages).

Arthur et al., "Three-Dimensional Electrodes and Battery Architectures," Materials Research Society, vol. 36, (2011) (in 9 pages).

Roberts et al.,"3D Lithium Ion Batteries—From Fundamentals to Fabrication," Journal of Materials Chemistry, vol. 21 (27), (2011) (in 16 pages).

Long et al., "Three-Dimensional Battery Architectures," Chem. Rev., vol. 104, 4463-4492 (2004) (in 30 pages).

Sun et al., "3D Printing of Interdigitated Li-Ion Microbattery Architectures", Adv. Mater. 25, 4539-4543 (2013) (in 5 pages).

Hur, et al., "High Areal Energy Density 3D Lithium-Ion Microbatteries", found at: https://doi.org/10.1016/j.ioule.2018.04.002 (2018) (in 16 pages).

Delacourt et al., "Measurements and Simulations of Electrochemical Impedance Spectroscopy of a Three-Electrode Coin Cell Design for Li-Ion Cell Testing," (Journal of The Electrochemical Society, 161 (9), 2014) (in 8 pages).

Scipioni et al., "A Physically-Based Equivalent Circuit Model of the Impedance of a LiFePO4/Graphite 26650 Cylindrical Cell," (Journal of The Electrochemical Society, 164 (9), 2017) (in 14 pages).

Kim et al., "Metamodel-Based Optimization of a Lithium-Ion Battery Cell for Maximization of Energy Density with Evolutionary Algorithm," Journal of The Electrochemical Society, 166 (2), A211-A216 (2019) (in 6 pages).

Ogihara et al., "Impedance Spectroscopy Characterization of Porous Electrodes Under Different Electrode Thickness Using a Symmetric Cell for High-Performance Lithium-Ion Batteries," Journal of Physical Chemistry, 119, 4612-4619 (2015) (in 8 pages).

Ender et al., "Analysis of Three-electrode Setups for AC-Impedance Measurements on Lithium-Ion Cells by FEM Simulations," Journal of The Electrochemical Society, 159 (2), A128-A136 (2012) (in 9 pages).

Ogihara et al.,"Theoretical and Experimental Analysis of Porous Electrodes for Lithium-Ion Batteries by Electrochemical Impedance Spectroscopy Using a Symmetric Cell," Journal of The Electrochemical Society, 159 (7), A1034-A1039 (2012) (in 6 pages).

Itagaki et al., "Impedance Analysis on Electric Double Layer Capacitor with Transmission Line Model," Journal of Power Sources, 164, 415-424 (2007) (in 10 pages).

Yoo et al., "Simulation Based Design of Lithium Ion Battery Configuration Using Bayesian Optimization" George Institute of Technology, Aug. 2018 2018.

Malifarge et al., "Determination of Toruosity Using Spectra Analysis of Symmetric Cell Journal of the Electrochemical Society", 164 (11) 2017.

* cited by examiner

BATTERY DESIGN IN MULTIPLE DIMENSIONS

CROSS-REFERENCE TO RELATED APPLICATIONS

This application is a continuation-in-part of and claims priority from U.S. application Ser. No. 16/698,286, filed Nov. 27, 2019, entitled "SYSTEMS AND METHODS FOR OPTIMIZING BATTERY DESIGNS IN MULTIPLE DIMENSIONS," which is hereby wholly incorporated by reference.

TECHNICAL FIELD

The subject matter described herein relates, in general, to a multi-dimensional battery design, and, in particular, to an improved electrode geometry that optimizes power and capacity of the battery.

BACKGROUND

In the age of the Internet of Things (IoT), in which things and people are connected via the internet, there is a growing need for improving the power source for such devices. Some of the key properties for the power source are power, energy density, and lifetime (or cyclability), and a promising candidate, the micro lithium-ion battery, is attracting attention in the world. However, in general, the micro-battery has a problem with a small amount of battery capacity and, therefore, low energy density since it is difficult to load enough active materials in a small space. Thus, there is a need to look beyond the overall packaging constraints and focus attention on designing the battery at the micro-scale level for achieving advancements in power, energy density, and cyclability.

SUMMARY

An improved battery design is disclosed herein. In one embodiment, a battery is disclosed. The battery includes a first collector plate and a second collector plate arranged in parallel and spaced apart by an internal distance. The battery includes a first electrode and a second electrode disposed between the first collector and the second collector. The first electrode and the second electrode have a geometry that improves power and capacity of the battery. The battery further includes a separator disposed between the first electrode and the second electrode.

In one embodiment, a battery is disclosed. The battery includes a first electrode and a second electrode disposed adjacently and separated by a separator. The first electrode having a first geometry and the second electrode having a second geometry. The first geometry and the second geometry being complementary and interlocking.

In one embodiment, a micro lithium-ion battery is disclosed. The micro lithium-ion battery includes a first collector plate and a second collector plate arranged in parallel and spaced apart by an internal distance. The micro lithium-ion battery includes a first electrode and a second electrode disposed adjacently between the first collector and the second collector within the internal distance. The first electrode having a first geometry and the second electrode having a second geometry that improves power and capacity of the battery. The first geometry is hook-shaped, and the second geometry complements the hook shape to interlock the first electrode and the second electrode. The first geometry and the second geometry are comprised of a series of teeth. The micro lithium-ion battery includes a separator disposed between the first electrode and the second electrode.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Embodiments associated with a novel electrode design for a micro lithium-ion battery are disclosed. As mentioned previously, various advances in technology induce pressures to adapt batteries that can further facilitate technology. Thus, in the case of IoT devices and other mobile or small form factor electronics, there is a general pressure to reduce battery size while maintaining power density and energy density. That is, even though the devices may be small, these devices still require a battery to provide a certain level of power to support functionality and/or reduce a need to change batteries or recharge. However, as previously noted, existing electrode designs generally do not meet these needs and do not generally include complex geometries.

Figure 1:
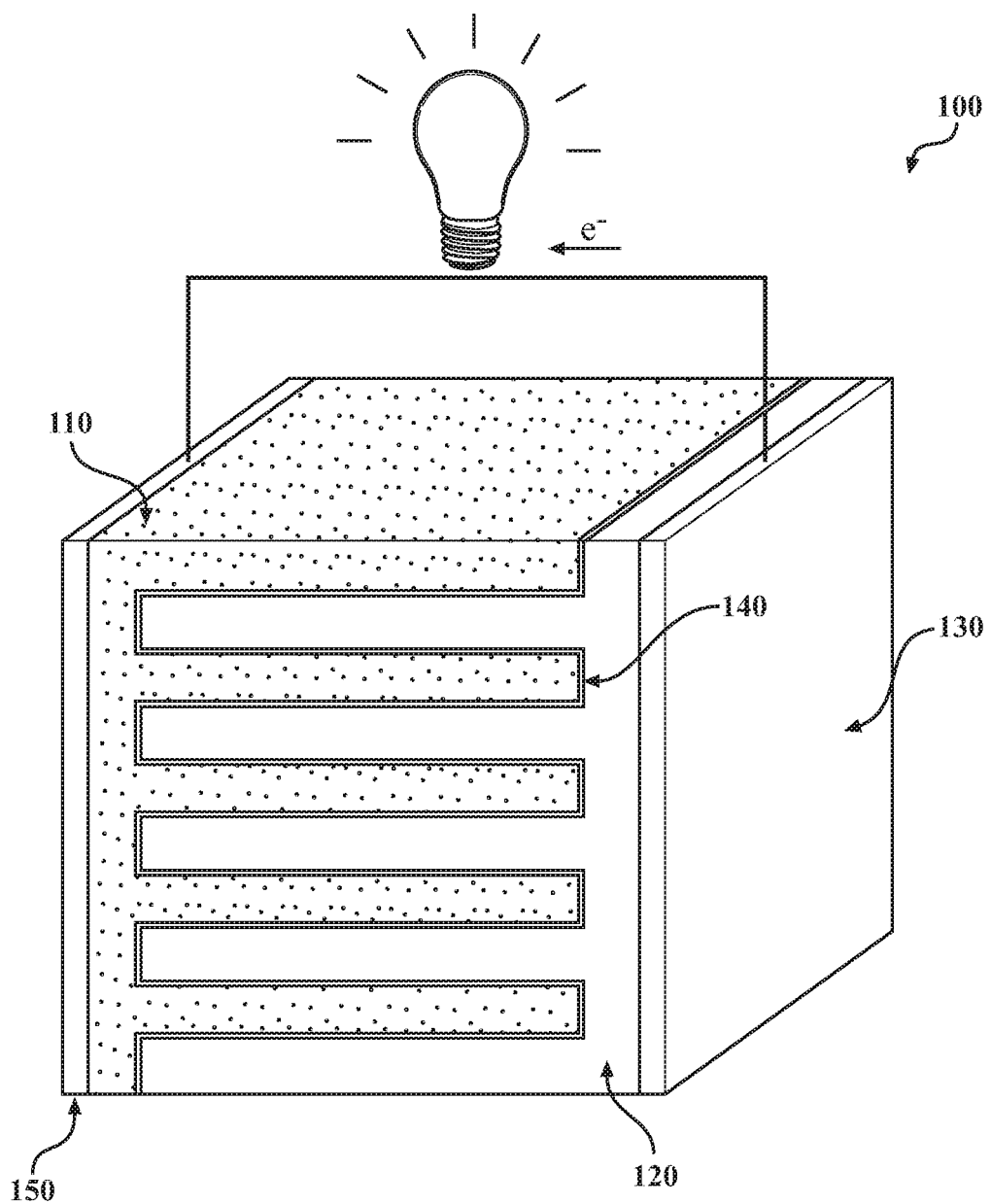
FIG. 1 illustrates one embodiment of a battery with cuboid-shaped teeth.
Figure 2:
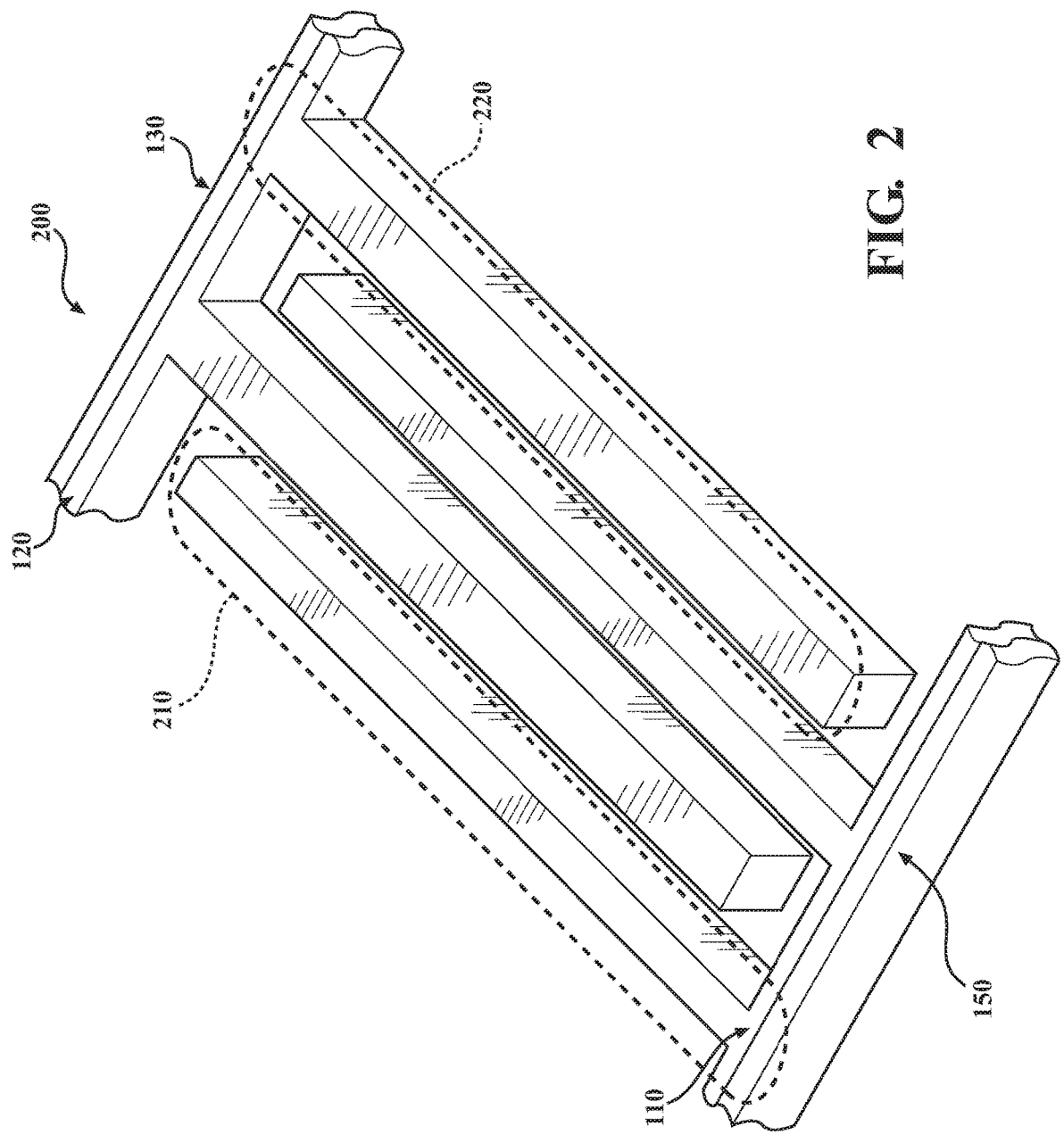
FIG. 2 is an additional view of the cuboid-shaped teeth of FIG. 1.

For example, with reference to FIG. 1, consider the battery design 100. As shown, the battery design 100 includes a positive electrode 110, a negative electrode 120, a current collector 130, a separator 140, and a current collector 150. It should be appreciated that the noted elements are illustrated for purposes of explanation and do not represent an exhaustive listing of elements that may be included within the battery 100. In any case, the electrodes 110 and 120 have a geometry that includes comb-like teeth of a cuboid shape, which do not interlock. That is, as shown, the electrodes 110 and 120 appear as though they could slide outwardly without obstruction. Thus, the electrodes 110 and 120 exhibit a simple geometry that may result in increased internal resistance and reduced capacity. As a further illustration of the geometry of the electrodes 110 and 120, consider FIG. 2, which illustrates a sliced view 200 of the electrodes 110 and 120. As shown in FIG. 2, the electrode 110 (corresponding with exemplary comb-shaped tooth 210) and 120 (corresponding with exemplary comb-shaped tooth 220) are, from a high-level perspective, rectangular cuboids without any interlocking geometry. While this basic electrode geometry provides a functional battery design, the resulting battery may not optimize various characteristics.

As such, through a process of optimization using a multi-dimensional transmission line model, a complex geometry for the electrodes is derived that optimizes the power and capacity of the battery design through minimizing the internal resistance of the battery while maintaining the volume of the separator at some defined value. In one approach, the noted design is achieved by optimizing an interface between the electrodes in order to reduce the internal resistance without modifying the volume of the separator between designs (e.g., while maintaining the separator volume as a constant value). For example, as an additional contextual explanation, a system may function by defining general battery specifications for designing a battery including aspects such as separator thickness, element resolution, battery volume, and so on. In further aspects, the battery specification may include a finer granularity of information about the battery, such as materials for separate elements, properties of the materials, symmetric cell impedance measurements, and so on. In any event, the system uses this information as a basic outline of how to generate electrode designs for the battery.

Thus, the system then, in one approach, prepares a vacant battery cell and divides space within the battery cell according to the defined resolution. The defined resolution generally controls a size of electrode elements that the system places into the battery cell. Thus, in one approach, the system uses sub-components to represent the electrode elements (e.g., sub-portions of an overall electrode) that are geometrically defined by, for example, a resolution and shape associated with capabilities of a manufacturing process for the battery. Thus, the sub-components may be cuboid-shaped and have a particular size (i.e., height, width, length) in relation to the overall electrode and the battery overall. In further aspects, the system may define the electrode elements according to different geometries other than cuboids (e.g., interlocking polyhedrons, etc.). In any case, the system forms the separate electrodes within the battery cell using the elements in a defined manner to produce, for example, one or many different iterations of the electrode designs.

The manner in which the system fills the battery cell with the electrode elements to derive a battery design can involve, in various embodiments, arranging the electrode elements for positive and negative electrodes within the cell according to a set of rules. For example, the rules generally define acceptable geometries for placing the electrode elements that avoid isolating opposing types of electrode elements (e.g., surrounding/isolating a positive electrode with negative electrodes or vice versa, placement of negative electrodes next to a current collector of positive electrode side, etc.). Accordingly, the system supervises the design process by identifying acceptable locations for placement of elements during a random sampling process of the battery cell to ensure the noted difficulties do not occur.

In any case, once one or more electrode designs are available, the system can proceed with the analysis of the electrode designs to determine various attributes such as internal resistance, impedance, and other aspects. Accordingly, because the battery design generally uses porous electrodes for both positive and negative electrodes, the system generates equivalent circuits for the designs that describe electrochemical reactions in the porous electrodes. This approach provides, for example, a mechanism for evaluating aspects of the design, such as internal resistance ($R_{inter}$) of the lithium-ion battery.

In particular, in at least one implementation, the system adapts and extends a transmission line model to handle multi-dimensional porous electrodes. Thus, the system divides an electrode design into circuit elements in multiple dimensions, thereby providing multiple degrees of freedom in the analysis instead of being restrained to a single dimension (e.g., only thickness). This permits the system to analyze complex electrode geometries as created by the random sampling approach. For example, the system generates the equivalent circuits according to the multi-dimensional porous electrode model by initially dividing the electrodes in the cell into sub-elements. The divisions may mirror the resolution involved in originally producing a design or may use elements of a finer resolution (e.g., smaller cuboids) to provide improved fidelity. In any case, the system divides the design into a plurality of elements (e.g., 30×150) that have equal sizes and shapes.

The system then connects the elements to define at least ion and electron resistances, thereby representing the connections as separate resistors according to the defined geometric degrees of freedom for the model (e.g., two or more). After connecting the resistances, separate corresponding series models/circuits are connected interfacially according to impedances. The separate elements (resistors, etc.) represent separate paths within the electrodes and, thus, the separate reactions between the porous electrodes. Thus, by generating the multi-dimensional transmission line electrode models (i.e., equivalent circuits) having two or more geometric degrees of freedom, the system can better assess attributes of complex electrode designs to generate and determine improved batteries having, for example, improved internal resistances that can correspond to higher power and energy densities and improved battery performance.

Accordingly, from the noted process, the system may generate various designs and may further identify a particular design as having optimized characteristics. The optimized characteristics include, in one or more examples, improved internal resistance while maintaining a constant separator volume within the battery that results in improving the power and capacity of the battery. One such example of an optimized battery design that includes an optimal internal resistance may exhibit a novel electrode geometry that is characterized by an interlocking shape. That is, as opposed to a simple cuboid geometry, as shown in FIGS. 1-2 for the electrodes, the electrodes may exhibit an interlocking shape, such as a c-shape or hook shape for one electrode complemented by an opposing shape that fits the hook/c-shape for the other electrode of a pair thereby forming the interlocking shape. In this way, the battery design improves the noted characteristics by, for example, optimizing an interface of the electrodes.

Figure 3:
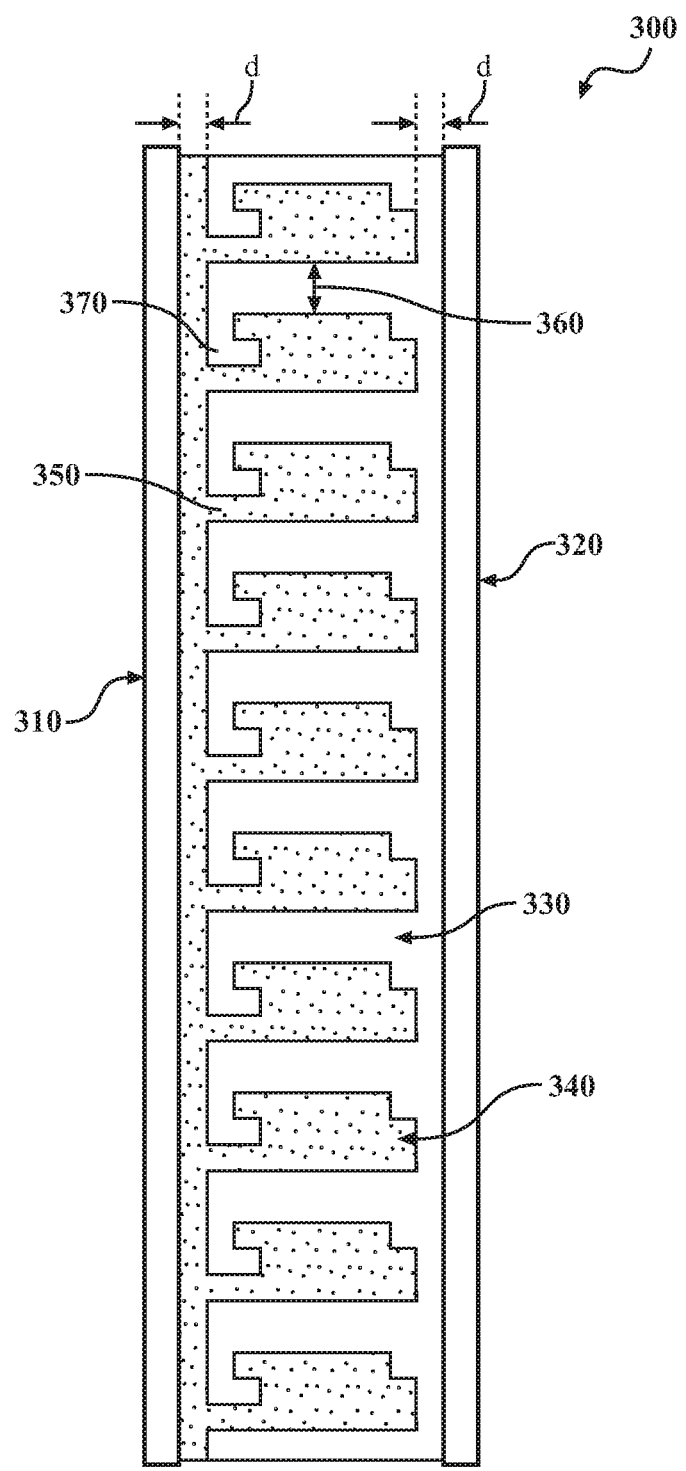
FIG. 3 is a side view of a battery design including electrodes having an interlocking geometry.

Accordingly, with reference to FIG. 3, one embodiment of a battery 300 is shown from a side-view. As shown, the battery 300 is comprised of a collector plate 310, a collector plate 320, an electrode 330 (e.g., negative electrode), and an electrode 340 (e.g., positive electrode). The battery 300, in various embodiments, includes further elements such as a separator between the first electrode 330 and the second electrode 340. The battery 300 may further include a housing or encapsulant that contains the elements shown in FIG. 3. The housing/encapsulant may be comprised of any suitable material and may include electrical leads operatively attached to the collector plates 310 and 320 that function to form electrical connections with the battery 300.

In general, the first collector plate 310 and the second collector plate 320 are arranged in parallel and define an internal distance therebetween within which the electrodes 330 and 340 are formed. The collector plates 310 and 320 may define an outer boundary of the battery 300 (without consideration to any housing/encapsulant). The outer boundary/dimensions of the battery 300 are, in one example, 600 μm wide (excluding a thickness of the current collectors) by 3000 μm in height by 3000 μm long. Of course, while the noted dimensions are provided as one example, in further embodiments, the dimensions may vary according to a particular implementation. Moreover, the particular ratio of width, height, and length may also vary without departing from the spirit of the noted design.

In any case, the internal distance between the collector plates 310 and 320 is, in one embodiment, about 600 μm. The collector plates 310 and 320 may vary in thickness according to the particular design. In one example, each collector plate is in the range of about 10 to 15 μm wide. Additionally, the electrodes 330 and 340 are spaced away from opposing collector plates by a minimum distance "d," which may be 60 μm. In general, the distance "d" is defined according to a resolution of the design for the battery 300. In one embodiment, a manufacturing process defines the resolution for the design and generally follows a smallest pitch for the respective materials that may be formed by the process.

Consequently, the resolution may further control aspects relating to other elements in the battery 300. For example, the geometry of the teeth that comprise the electrodes 330 and 340 derives from the resolution or at least limitations on the geometry. With continued reference to FIG. 3, consider geometries highlighted by 350, 360, and 370. The extension 350 of the electrode 340 through a gap defined by teeth of the electrode 330 is generally defined according to the resolution of the design for the battery 300 and, thus, as shown, may be about 60 μm. Moreover, the width 360 is generally a multiple of the resolution. Thus, teeth of the electrode 340 are shown as having a maximum width of 180 μm. The width of the teeth for the electrodes is, in one embodiment, within the range of 180 μm to 240 μm. Thus, as shown, teeth of the electrode 330 are, for example, 240 μm wide while teeth of the electrode 340 are 180 μm wide at a thickest portion.

The electrodes 330 and 340 are separately comprised of a series of teeth. As shown in the battery 300, the electrode 340 includes ten separate teeth, and the electrode 330 includes eleven teeth. The teeth of the electrode 330 include nine intervening teeth of a repeating pattern and two distinct end teeth that are, for example, partial forms of the intervening teeth having an irregular form. In any case, the electrodes 330 and 340 are generally comprised of a series of comb-like teeth having complementary shapes. The complementary shapes may take different forms depending on a particular design but generally interlock, as shown with the battery 300. That is, for example, the geometries of the teeth interlock such that if they were separable, they would not slide apart but would instead remain locked together because of the respective geometries. The hook 370 of the teeth of the electrode 330 demonstrates this interlocking shape with a portion of each tooth extending back into a respective tooth of the electrode 340. In this way, the teeth form the complementary interlocking shape that optimizes (e.g., reduces an internal resistance) an interface between the electrodes while maintaining relative volumes of the electrodes 330 and 340.

Additionally, the battery 300 is, in one embodiment, a micro lithium-ion battery, and the active materials of the electrodes 330 and 340 are graphite and lithium nickel cobalt aluminum oxide, respectively. Of course, in further embodiments, the battery 300 may be nickel-metal hydride (NiMH), nickel-cadmium (NiCd), lithium-ion polymer (LiPo), lithium-ion phosphate, or another rechargeable form of battery. As an additional aspect of the battery 300, FIG. 3 does not explicitly illustrate a separator between the electrodes 330 and 340; however, it should be appreciated that the battery 300 includes a separator that isolates the electrodes 330 and 340. The separator is, in one embodiment, about 20 μm in thickness and may be formed from polyolefin or another suitable material.

Figure 4:
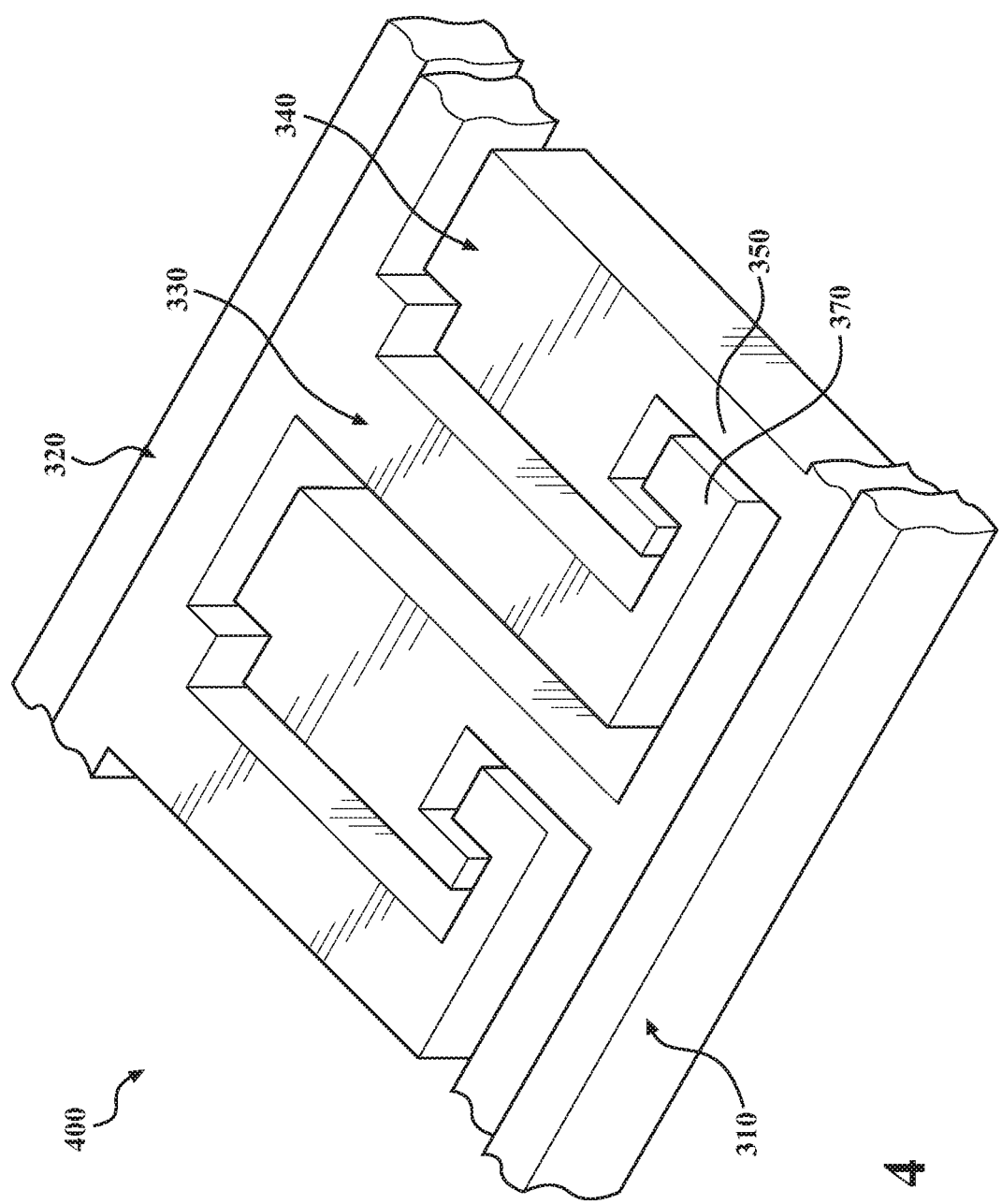
FIG. 4 is an additional view of the interlocking geometry of FIG. 3.

As a further example of the particular arrangement of teeth for the respective electrodes 330 and 340, consider FIG. 4. FIG. 4 illustrates a cutaway view 400 of the teeth of the electrodes 330 and 340. Additionally, as shown in FIG. 4, space between the teeth is where the separator resides, although not explicitly shown for purposes of explanation herein. Thus, FIG. 4 further illustrates the complementary geometries of the teeth of the respective electrodes and how the teeth form respective interlocking shapes.

It should be appreciated that while the battery 300 is discussed as being comprised of various materials, in further embodiments, the materials may vary while retaining the general geometry of the electrodes, as shown. For example, in one aspect, a design of the battery may specify aspects such as a battery volume, a number of electrode elements (i.e., a resolution/size of elements for constructing the electrodes, such as teeth), a ratio of positive electrode elements to negative electrode elements, and a separator thickness. In further aspects, the battery specification may include additional or fewer components. For example, in one embodiment, the battery specification may define material types for different aspects of the battery (e.g., aluminum collector, copper collector, etc.), and so on. Thus, a design of the battery 300 may vary different aspects without departing from the general spirit of the indicated geometry from which the improved aspects are derived.

Figure 5:
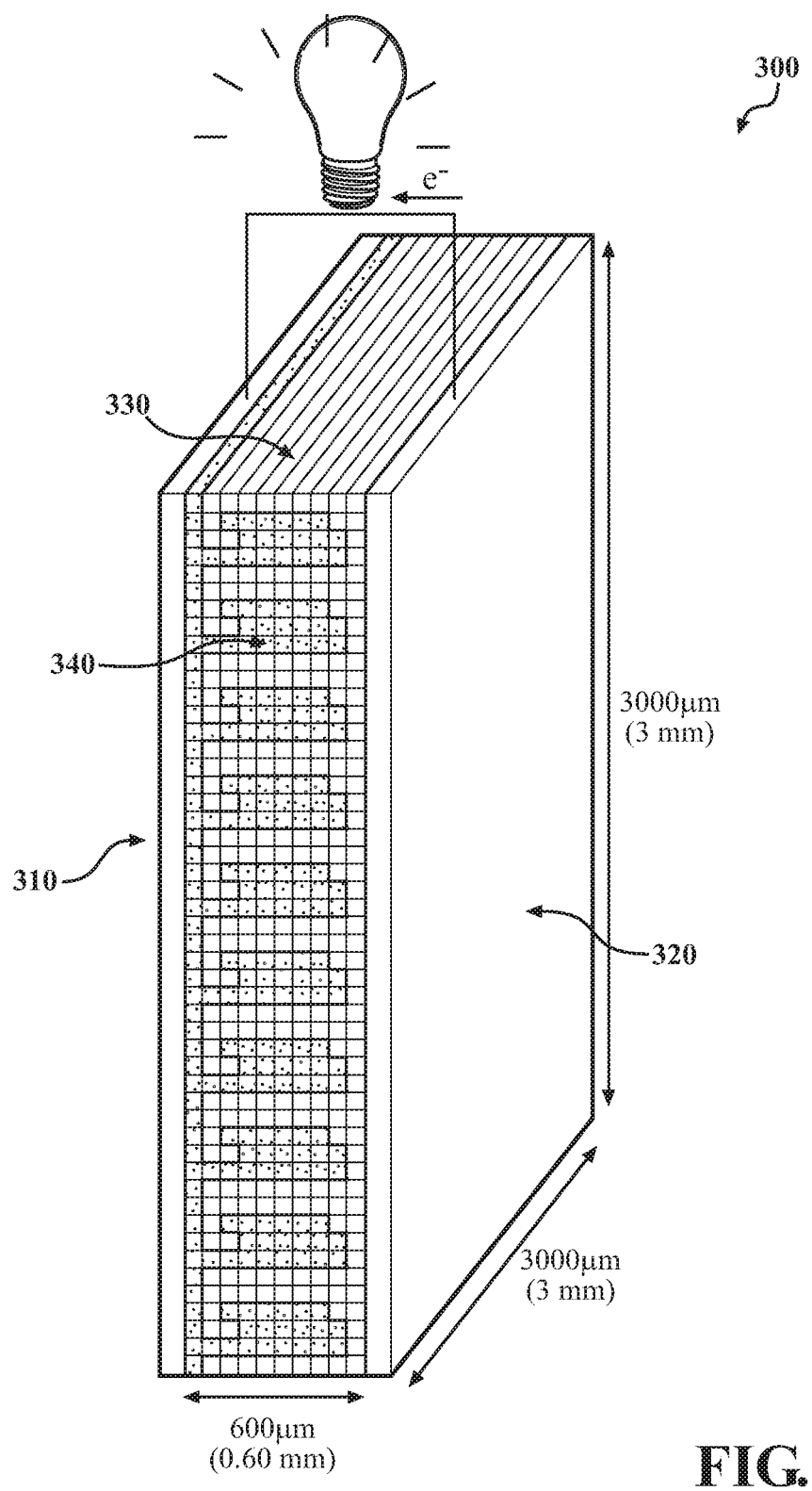
FIG. 5 is a three-dimensional view of a battery having electrodes with an interlocking geometry.

As a further example of the design for the battery 300 of FIG. 3, consider FIG. 5, which illustrates a three-dimensional view of the battery 300. As shown in FIG. 5, the resolution is about 60 μm, and the battery has dimensions of 600 μm×3000 μm×3000 μm, divided into 10×50×1 elements, a ratio of 1:1, and a separator thickness of 20 μm. In further embodiments, the resolution of the battery may be in the range of 30 μm to 100 μm. In any case, as shown, the separate aspects of the battery 300 extend a whole length of the battery 300. As previously noted, the size of the electrode elements (i.e., sub-elements comprising the teeth of the electrodes) may correspond to a resolution of a manufacturing process for the battery (e.g., minimum pitch for an inkjet printing process, 3D printing process, etc.). Thus, the size and shape of the sub-elements may have a shape (e.g., cuboids, or another defined geometric form) and size that are defined by the resolution.

In determining whether the particular design of the battery 300 improves power, the analysis using the previously noted multi-dimensional transmission line model may be undertaken. Accordingly, a computing system using the noted model as described in the co-pending application to determine the equivalent circuit for the battery 300 from which various attributes are derived. In one embodiment, the system calculates values of the electron resistances and the ionic resistances according to a volume of the electrode elements, the separator thickness, and related resistivity parameters, such as ion and electron resistivities of the electrodes. Moreover, the system may further calculate, in one embodiment, values of the charge-transfer resistances $R_{CT}$, and the electric double-layer capacitances Cal according to the battery volume, the separator thickness, and related parameters.

From this information, the system may further determine additional attributes of the equivalent circuit, such as an impedance and an internal resistance of the battery cell, which can indicate improvements to power of the battery 300. For example, the system, in one embodiment, extracts an equivalent internal resistance by removing electric double-layer capacitances of the equivalent circuit, and collapsing the equivalent circuit to the equivalent resistance through a process of combining series elements of the equivalent circuit and parallel elements of the equivalent circuit until the equivalent resistance remains. As an additional explanation of how the system determines the attributes, consider the following discussion relating to evaluating impedance and internal resistance.

In regards to the noted resistances and capacitances identified previously, consider the following as an additional explanation of how the attributes for the battery 300 may be assessed in determining whether the battery 300 improves on the noted characteristics.

$$R[\Omega] = \rho[\Omega cm] \times \frac{L[cm]}{A[cm^2]} \qquad (1)$$

Where $\rho$ is the electrical resistivity, and where L and A are the length and cross-sectional area of the resistance, respectively. The electric double-layer capacitance of the interface between the electrolyte and the electrode is defined by:

$$C_{dl}[F] = \epsilon_{dl}[F/cm] \times \frac{A_{reac}[cm^2]}{d_{dl}[cm]} \qquad (2)$$

Where $\epsilon_{dl}$ and $d_{dl}$ are the permittivity and the thickness of the electric double layer, respectively, and where $A_{reac}$ is the electrode surface area. Electron resistances $R_e$ are defined as the resistance between positive electrodes ($R_e^{pos}$), negative electrodes ($R_e^{neg}$), current collectors ($R_e^{ccp}$ for the positive electrode side, and $R_e^{ccn}$ for the negative electrode side), and between the electrode and current collector ($R_e^{pos/cc}$ and $R_e^{pos/cc}$). The resistance that connects the identical/same electrode elements are defined by:

$$R_e^{pos} = \rho_e^{pos} \times \frac{l}{a} \qquad (3)$$

$$R_e^{neg} = \rho_e^{neg} \times \frac{l}{a} \qquad (4)$$

Where $\rho_e^{pos}$ and $\rho_e^{neg}$ are the electron resistivities of the positive and negative electrodes, respectively, and where l and a are the distance and cross-sectional area of the connecting two elements, respectively. The resistance between the current collectors are computed using the following:

$$R_e^{ccp} = \rho_e^{ccp} \times \frac{l}{a} \qquad (5)$$

$$R_e^{ccn} = \rho_e^{ccn} \times \frac{l}{a} \qquad (6)$$

Where $\rho_e^{ccp}$ and $\rho_e^{ccn}$ are the electron resistivities of the current collectors of the positive and negative electrodes, respectively. The resistance between the electrode and the current collector is defined by:

$$R_e^{pos/cc} = \rho_e^{pos} \times \frac{l/2}{a} + \rho_e^{ccp} \times \frac{l_c}{a} \qquad (7)$$

$$R_e^{neg/cc} = \rho_e^{neg} \times \frac{l/2}{a} + \rho_e^{ccn} \times \frac{l_c}{a} \qquad (8)$$

Where $l_c$ is the distance between the current collector and the edge of the electrode. Additionally, since $\rho_e^{ccp}$ and $\rho_e^{ccn}$, in various circumstances, are nearly zero, $R_e^{pos/cc}$ and $R_e^{neg/cc}$ can be approximated as:

$$R_e^{pos/cc} \approx \rho_e^{pos} \times \frac{l/2}{a} \qquad (9)$$

$$R_e^{neg/cc} \approx \rho_e^{neg} \times \frac{l/2}{a} \qquad (10)$$

The equivalent circuit may further include three separate types of ion resistances including the resistance between the positive electrodes and the negative electrodes as well as the resistance between positive and negative electrodes and the separator. Ion resistances between the same electrodes are defined by:

$$R_{ion}^{pos} = \rho_{ion}^{pos} \times \frac{l}{a} \qquad (11)$$

$$R_{ion}^{neg} = \rho_{ion}^{neg} \times \frac{l}{a} \qquad (12)$$

Where $\rho_{ion}^{pos}$ and $\rho_{ion}^{neg}$ are the ionic resistivities of the positive and negative electrodes, respectively. The resistance at the interface between the positive and negative electrodes is defined by:

$$R_{ion}^{sep} = \rho_{ion}^{pos} \times \frac{(l-s)/2}{a} + \rho_{ion}^{neg} \times \frac{(l-s)/2}{a} + \rho_{ion}^{sep} \times \frac{s}{a} \qquad (13)$$

Where s is the thickness of the separator and $\rho_{ion}^{sep}$ is the ionic resistivity of the separator. In general, $\rho_{ion}^{pos}$, $\rho_{ion}^{neg}$, and $\rho_{ion}^{sep}$ are different from the ionic resistivity of the bulk electrolyte since it changes with the structural properties of the electrodes and separator. The charge transfer resistance is defined by:

$$R_{ct}^{pos} = \rho_{ct}^{pos/sol} \times \frac{1}{a_{reac}} \qquad (14)$$

$$R_{ct}^{neg} = \rho_{ct}^{neg/sol} \times \frac{1}{a_{reac}} \qquad (15)$$

Where $\rho_{ct}^{pos/sol}$ and $\rho_{ct}^{neg/sol}$ and $\rho_{ct}^{neg/sol}$ are the contact resistivities of the interface between the electrolyte and the positive and negative electrodes, and where $a_{reac}$ is the reaction surface area. The reaction surface area is computed by:

$$a_{reac} = cv_{electrode} \qquad (16)$$

Where $v_{electrode}$ is the volume of the electrode in one element, and corresponds to the volume of the element. c is the conversion factor. As a general note, at the interface between two electrodes, the volume of the electrode is not consistent with the volume of the element due to the existence of the separator and, thus, is given by:

$$v_{electrode} = v_{element} - v_{separator} \quad (17)$$

Where $v_{element}$ and $v_{separator}$ are the volume of the element and the separator, respectively. Substituting EQ. 16 into EQS. 14 and 15 provides:

$$R_{ct}^{pos} = \rho_{ct}^{pos/sol} \times \frac{1}{cv_{electrode}} = \frac{\sigma_{ct}^{pos/sol}}{v_{electrode}} \quad (18)$$

$$R_{ct}^{neg} = \rho_{ct}^{neg/sol} \times \frac{1}{cv_{electrode}} = \frac{\sigma_{ct}^{neg/sol}}{v_{electrode}} \quad (19)$$

Where the unit of the $\sigma_{ct}(=\rho_{ct}/c)$ is $\Omega cm^3$. The electric double-layer capacitance between the electrolyte and the electrode is defined by:

$$C_{dl}^{pos}[F] = \epsilon_{dl}^{\frac{pos}{sol}} \left[\frac{F}{cm}\right] \times \frac{a_{reac}[cm^2]}{d_{dl}[cm]} \quad (20)$$

$$C_{dl}^{neg}[F] = \epsilon_{dl}^{\frac{neg}{sol}} \left[\frac{F}{cm}\right] \times \frac{a_{reac}[cm^2]}{d_{dl}[cm]} \quad (21)$$

Where $$\epsilon_{dl}^{\frac{pos}{sol}} \text{ and } \epsilon_{dl}^{\frac{neg}{sol}}$$

are the permittivities of the electric double layer. By substituting EQ. 16 into EQS. 20 and 21:

$$C_{dl}^{pos}[F] = \epsilon_{dl}^{\frac{pos}{sol}} \times \frac{cv_{electrode}}{d_{dl}} = \varsigma_{dl}^{pos/sol} v_{electrode} \quad (22)$$

$$C_{dl}^{neg}[F] = \epsilon_{dl}^{\frac{neg}{sol}} \times \frac{cv_{electrode}}{d_{dl}} = \varsigma_{dl}^{neg/sol} v_{electrode} \quad (23)$$

To compute the internal resistance, the system may use the parameters related to the geometry of the design, such as l, a, s, and $v_{electrode}$, which the system may derive from the battery specification and the resolution of the design. The system may obtain further parameters from, for example, AC impedance analysis of a symmetric cell representation of the design. To compute $R_e$ and $R_{ion}$, the system generally uses at least the electron and ionic resistivities ($\rho_e$, $\rho_{ion}$) as input parameters. To compute $R_{ct}$ and $C_{dl}$, the system, in one approach, uses $\sigma_{ct}$ and $\varsigma_{dl}$, as defined in the following section.

Because the symmetric cell has two interfaces between the electrode and the separator, the relationship between the experimentally observed charge-transfer resistance ($R_{ct}^{exptl.}$) and $\sigma_{ct}$ is obtained by:

$$R_{ct}^{exptl.} = \frac{\sigma_{ct}}{WD(H-s)/2} + \frac{\sigma_{ct}}{WD(H-s)/2} = \frac{4\sigma_{ct}}{WD(H-s)} \quad (24)$$

-continued $$\sigma_{ct} = \frac{WD(H-s)}{4} R_{ct}^{exptl.} \quad (25)$$

Where $\sigma_{ct}$ is the charge transfer resistivity. $\varsigma_{dl}$ is determined according to the relationship between the top of the capacitative semi-circle ($f_{max}$) and the product of $R_{ct}$ and $C_{dl}$.

$$R_{ct}C_{dl} = \frac{1}{2\pi f_{max}} \quad (26)$$

Substituting EQS. (18) and (22) or (19) and (23) into EQ. (26) we obtain:

$$\varsigma_{dl} = \frac{1}{2\pi f_{max}\sigma_{ct}} \quad (27)$$

Thus, the system, in one embodiment, implements EQ. (25) and EQ. (27) in relation to the equivalent circuit to derive one or more of the attributes. In this way, the system produces the equivalent circuit for the battery 300 using multiple degrees of freedom from the designs and analyzes the design in order to critically assess attributes of the design. This novel reconstruction of the equivalent circuit provides a basis for analyzing reactions inside the porous electrode and determining various parameters in order to identify and select improved designs for the subsequent manufacture of the battery.

Figure 6:
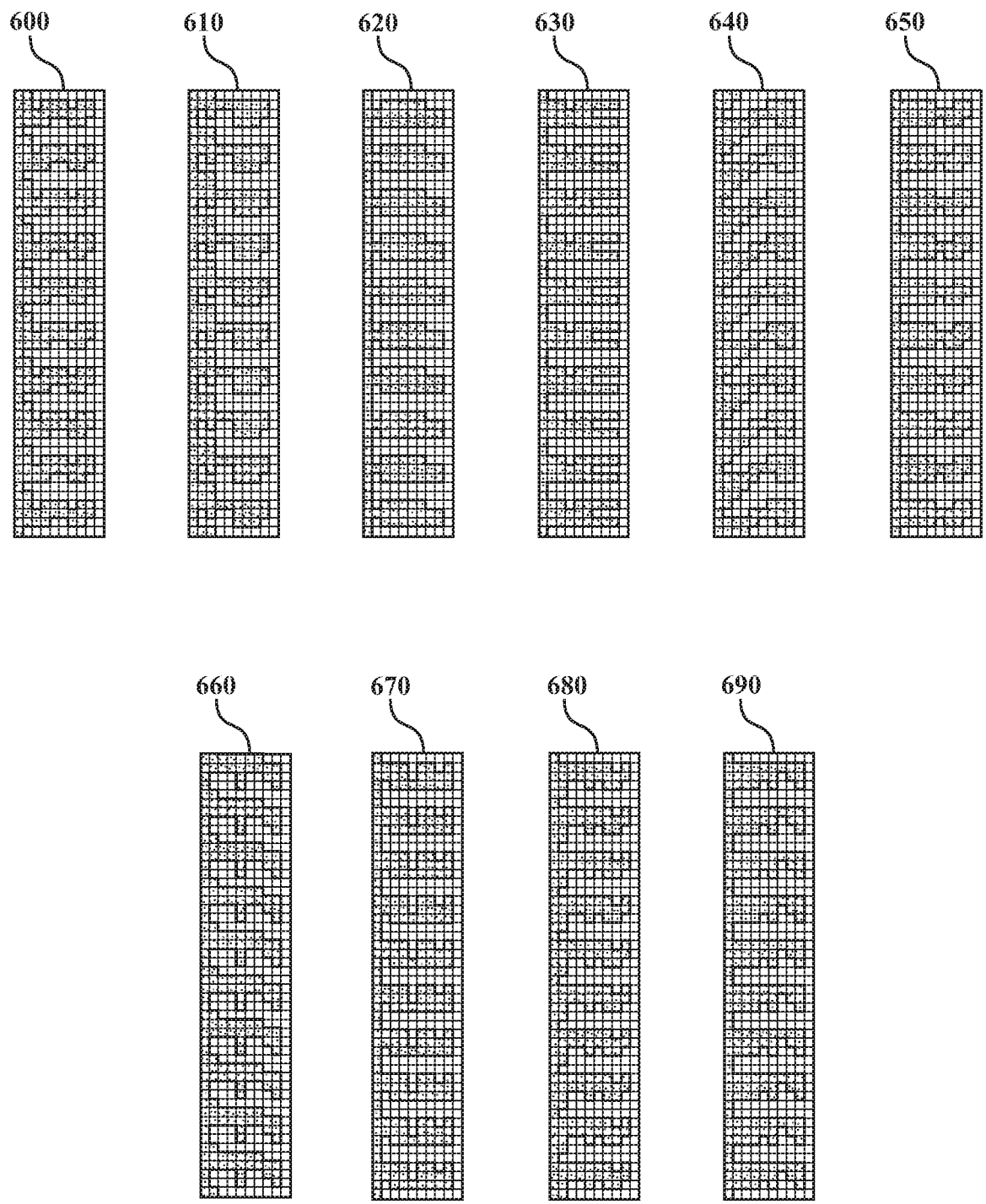
FIG. 6 illustrates multiple different interlocking geometries of electrodes.

Accordingly, from this analysis, the system may assess multiple different designs in order to determine which designs exhibit improved attributes. While the design of FIGS. 3-5 generally optimizes the interface between the electrodes and exhibits such improvements, further consider FIG. 6, which illustrates alternative configurations for the battery 300. As shown in FIG. 6 multiple different electrode designs for a battery are illustrated. FIG. 6 illustrates design 600 that includes complimentary wave-shaped teeth. Design 610 illustrates a finger-like shape while design 620 illustrates an "I" shaped tooth design for one of the electrodes. It should be appreciated that respective designs include two electrodes with one electrode generally complementing a geometry of the other.

Thus, continuing with FIG. 6, battery design 630 illustrates a fork-like shape. Battery design 640 illustrates a slanted shape for the electrodes. Battery design 650 illustrates mid-tooth constriction/expansion type of design. Battery design 660 illustrates a segmented slant design, whereas designs 670, 680, and 690 all illustrate irregular tooth designs for the electrodes. The designs 600, 610, 620, 630, 640, 650, 660, 670, 680, and 690 all generally include interlocking geometries for the series of teeth that comprise the two electrodes in the respective designs. Moreover, the designs shown in FIG. 6 all generally omit illustration of the separator; however, as previously, noted the designs include a separate that may range in thickness from 5 to 20 μm. In any case, the illustrated designs of FIGS. 3-6 describe battery designs having improved internal resistances and electrode volumes (capacitances) in comparison to the general comb-like shape of the design 100 of FIG. 1. Thus, the described designs function to optimize an interface between the electrodes and thereby exhibit improved power and capacity.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A battery, comprising:
a first collector plate and a second collector plate arranged in parallel and spaced apart by an internal distance;
a first electrode and a second electrode disposed between the first collector plate and the second collector plate, wherein the first electrode and the second electrode have a geometry that improves power and capacity of the battery, wherein the geometry of the first electrode includes a plurality of identical repeating teeth structures that have an irregular shape and that interlock with second electrodes that include a plurality of identical repeating teeth structures, the teeth structures of the first electrode and the second electrode being complementary; and
a separator disposed between the first electrode and the second electrode.

2. The battery of claim 1, wherein the geometry of the first electrode and the second electrode is a complementary interlocking shape that optimizes an interface between the first electrode and the second electrode while maintaining relative volumes of the first electrode and the second electrode.

3. The battery of claim 1, wherein the geometry of the first electrode and the second electrode is comprised of a series of teeth having a comb shape that interlock, and wherein the series of the teeth are stacked from a top to a bottom of the battery in a repeating pattern and include intervening teeth having the repeating pattern and end teeth that are distinct from the intervening teeth.

4. The battery of claim 1, wherein a portion of the first electrode that is adjacent to the first collector plate has a first thickness that separates the second electrode from the first collector plate, and wherein a portion of the second electrode that is adjacent to the second collector has a second thickness that separates the first electrode from the second collector.

5. The battery of claim 4, wherein a thickness of the separator is approximately 20 µm, and wherein the first thickness and the second thickness are defined according to a resolution of a manufacturing process that forms the first and second electrodes.

6. The battery of claim 1, wherein a width of at least a portion of each tooth of the first electrode and the second electrode is in a range of 180 µm-240 µm.

7. The battery of claim 1, wherein the plurality of repeating teeth structures are asymmetric and complementary with teeth of the first electrode having a different repeating shape than teeth of the second electrode.

8. The battery of claim 1, wherein the first electrode is comprised of a first active material including one of lithium nickel cobalt aluminum oxide and graphite, and wherein the second electrode is comprised of a second active material including one of lithium nickel cobalt aluminum oxide and graphite.

9. The battery of claim 1, wherein the battery is approximately 600 µm by 3000 µm by 3000 µm.

10. A battery, comprising:
a first electrode and a second electrode disposed adjacently and separated by a separator, wherein the first electrode having a first geometry and the second electrode having a second geometry, the first geometry and the second geometry being complementary and interlocking, wherein the first geometry includes a plurality of identical repeating teeth structures that have an irregular shape and that interlock with the second geometry that includes a plurality of identical repeating teething structures.

11. The battery of claim 10, wherein the first geometry and the second geometry are comprised of a series of teeth having a comb shape that interlock.

12. The battery of claim 11, wherein the series of the teeth are stacked from a top to a bottom of the battery in a repeating pattern and include intervening teeth having the repeating pattern and end teeth that are distinct from the intervening teeth.

13. The battery of claim 10, wherein the first geometry is hook-shaped, and the second geometry complements the hook shape to interlock the first electrode and the second electrode.

14. The battery of claim 10, further comprising:
a first collector plate and a second collector plate arranged in parallel and spaced apart by an internal distance, wherein the first electrode and the second electrode are disposed between the first collector plate and the second collector plate, wherein the first electrode and the second electrode include a plurality of repeating teeth structures that interlock and have an irregular shape.

15. The battery of claim 10, wherein a portion of the first electrode that separates the second electrode from a first collector has a first thickness that is about 60 µm.

16. The battery of claim 10, wherein the battery is a micro lithium-ion battery.

17. A micro lithium-ion battery, comprising:
a first collector plate and a second collector plate arranged in parallel and spaced apart by an internal distance;
a first electrode and a second electrode disposed adjacently between the first collector plate and the second collector plate within the internal distance, the first electrode having a first geometry and the second electrode having a second geometry that improves power and capacity of the battery, wherein the first geometry and the second geometry are complementary and irregularly shaped to interlock the first electrode and the second electrode, and wherein the first geometry and the second geometry are comprised of a series of teeth that are separately identical; and a separator disposed between the first electrode and the second electrode.

18. The micro lithium-ion battery of claim 17, wherein the series of the teeth are stacked from a top to a bottom of the battery in a repeating pattern and include intervening teeth having the repeating pattern and end teeth that are distinct from the intervening teeth.

19. The micro lithium-ion battery of claim 17, wherein a width of at least a portion of each tooth of the first electrode and the second electrode is in a range of 180 μm-240 μm.

20. The micro lithium-ion battery of claim 17, wherein a thickness of the separator is approximately 20 μm, and wherein a resolution of a manufacturing process that forms the first electrode and the second electrode defines a distance separating the first electrode from the second collector plate and the second electrode from the first collector plate, wherein the first electrode is comprised of a first active material including one of lithium nickel cobalt aluminum oxide and graphite, and wherein the second electrode is comprised of a second active material including one of lithium nickel cobalt aluminum oxide and graphite.

* * * * *